Figure 1:
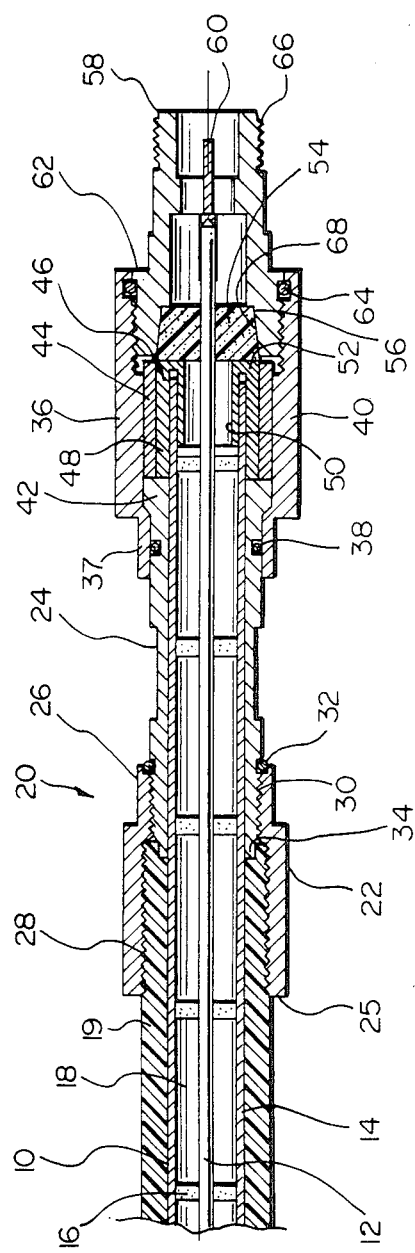

United States Patent [19]

Morin

[11] Patent Number: 4,689,440
[45] Date of Patent: Aug. 25, 1987

[54] GAS PRESSURIZABLE COAXIAL CABLES AND CABLE TERMINATION FITTING ASSEMBLIES

[75] Inventor: J. O. R. Morin, St-Hubert, Canada

[73] Assignee: Northern Telecom Limited, Montreal, Canada

[21] Appl. No.: 835,400

[22] Filed: Mar. 3, 1986

[51] Int. Cl.$^4$ .................. H02G 15/22; H01R 43/20
[52] U.S. Cl. ............................. 174/19; 29/857; 29/876; 29/884; 174/20; 174/21 R; 174/75 C; 174/77 R
[58] Field of Search ............ 174/19, 20, 21, 75 C, 174/77 R; 339/89 C, 94 C, 177 R, 177 E; 333/260, 261; 29/857, 876, 884

[56] References Cited

U.S. PATENT DOCUMENTS

| 2,691,058 | 10/1954 | Millar | 174/19 |
| 3,188,382 | 6/1965 | Fuss | 174/77 R |
| 3,671,926 | 6/1972 | Nepovim | 339/177 E |
| 3,710,005 | 1/1973 | French | 339/177 E X |
| 3,739,073 | 6/1973 | Schneider et al. | 174/20 X |

FOREIGN PATENT DOCUMENTS 511509  8/1939  United Kingdom ............... 174/77
774662  5/1957  United Kingdom ............ 174/77 R Primary Examiner—Morris H. Nimmo
Attorney, Agent, or Firm—R. J. Austin

[57] ABSTRACT

A gas pressurizable coaxial cable and termination fitting assembly in which a shroud means of the fitting is sealed to the jacket and extends beyond the jacket end to surround an end portion of a coaxial conductor assembly. The termination fitting also includes an annular dielectric plug which concentrically surrounds the inner conductor. The plug is resiliently compressible to seal against the inner conductor under a radial pressure exerted upon the plug and to release itself when the pressure is removed. A holding device is detachably mounted to hold the plug in a sealing position and also to form an airtight seal with the shroud means. The holding device engages one axial side of the plug to compress it against an abutment surface and opposing radial surfaces of the plug and device also apply a radial pressure to the plug.

13 Claims, 2 Drawing Figures

GAS PRESSURIZABLE COAXIAL CABLES AND CABLE TERMINATION FITTING ASSEMBLIES

This invention relates to gas pressurizable coaxial cable and cable termination fitting assemblies.

In a known gas pressurizable coaxial cable, there is provided an inner conductor surrounded by an outer conductor which is housed within a surrounding sheath. The outer conductor is held concentrically spaced from and electrically isolated from the inner conductor to define an axially extending chamber which surrounds the inner conductor. This chamber is gas pressurizable for the purpose of preventing moisture ingress along the cable. In these structures, cable termination fittings are assembled to the cable ends and it is usual practice to have a center conductor seal at the ends of the chamber formed from a snug fit insulating bushing with the use of petroleum jelly or silicone to minimize or prevent the escape of pressurized air from within the chamber. A problem which exists with this conventional construction is that the seal provided is not particularly effective and it is not unusual to have leakage of pressurized air from within the chamber of the cable.

The present invention provides a coaxial cable and cable termination fitting assembly and a method of making such an assembly which will overcome or lessen the leakage problem associated with a conventional air pressurized coaxial cable.

According to one aspect of the present invention there is provided a gas pressurizable coaxial cable and cable termination fitting assembly comprising:- (a) a cable with a core incorporating a coaxial conductor assembly in which an inner conductor and an outer conductor are provided, the outer conductor electrically isolated from and concentrically spaced around the inner conductor to define an annular air space between the conductors of the conductor assembly, a jacket surrounding the core with the said coaxial conductor assembly having an end portion extending axially beyond one end of the jacket at one end of the cable; (b) a cable termination fitting located at said one end of the cable, the fitting comprising: (i) an outer conductor shroud means sealed to the jacket and extending axially beyond said jacket and surrounding the end portion of the coaxial conductor assembly and assembly; (ii) an annular dielectric plug concentrically surrounding the inner conductor, the plug being resiliently compressible to seal against the inner conductor under a radial pressure upon the plug and to release itself from the inner conductor upon removal of the radial pressure, and means for holding the plug in a sealing position, said holding means detachably mounted upon and forming an airtight seal with the shroud means and engaging an axial side of the plug for urging the plug axially against an abutment surface, the plug and the holding means having opposing surfaces which are disposed to cause the holding means to apply radial pressure against the plug and compress the plug sealingly against the inner conductor.

In a preferred arrangement the plug is also sealed against the abutment surface to provide the airtight seal radially outwards from the end of the chamber. However, either alternatively or in addition, there is a seal provided between the shroud means and the holding means.

In one preferred arrangement, a single coaxial conductor assembly is provided in the core and concentrically within the surrounding jacket. In this case, the shroud means is formed with a female screw thread and is intimately screwed directly onto an end portion of the jacket, the shroud means also having an annular end sealing surface which is disposed in abutting sealing engagement against the end of the jacket by the screw connection between the shroud means and the jacket.

Alternatively and in another preferred arrangement, the core has at least two coaxial conductor assemblies each of which has an end portion extending axially beyond the one end of the jacket. In this arrangement, the shroud means includes a main sleeve means which is sealed to the jacket. The main sleeve means also comprises an end plate extending radially inwards and having orifices, one for each coaxial conductor assembly. The shroud means further includes secondary sleeve means sealingly secured to the end plate and aligned with each of the orifices. The end portions of the conductor assemblies extend, one through each of the secondary sleeve means and the holding means is airtightly secured to an associated secondary sleeve means.

The invention also includes a method of attaching a cable termination fitting to a gas pressurizable coaxial cable having a jacket and a core comprising at least one coaxial conductor assembly in which an inner conductor is surrounded by an outer conductor comprising: removing jacket material at one end of the cable to expose an end portion of at least one coaxial conductor assembly, said end portion extending axially beyond the end of the jacket; attaching an outer conductor shroud means of the fitting sealingly to the jacket with the shroud means extending axially beyond the jacket and surrounding said end portion of the at least one coaxial conductor assembly; locating an annular plug concentrically around the inner conductor and axially facing an abutment surface, the plug being resilient to radially inward compression under a radial pressure so as to return substantially to its uncompressed condition when the pressure is removed; detachably mounting a plug holding means to the shroud means to urge the plug against the abutment surface; and applying a radial pressure to the plug during mounting of the holding means so as to compress the plug radially inwards and cause it to apply sealing pressure against the inner conductor.

The plug is preferably formed from a material which is also heat resistant to enable it to resist degradation and detrimental softening of the material when the plug is loosely held around the inner conductor and a conductor terminating member is being attached to an end portion of the conductor with the use of heat such as in a soldering operation.

The above assembly and method of making the assembly according to the invention, provides an airtight seal for gas pressurizable coaxial cable in which the fitting may be dismantled either in whole or in part and then reassembled without interfering with the sealing efficiency of the plug itself. This is because the plug is made of a suitable material to enable it to be resiliently compressed for the sealing operation and then to enable it to expand upon the inner conductor for it to be removed subsequently.

With the coaxial cable and fitting assemblies used previously, there has been a further problem. This has concerned the method of attachment of fittings to cables in which a sleeve has been positioned around the cable jacket and crimping of the sleeve has been necessary for the attachment purpose. The problem which exists with this conventional method is that the crimping pressure has been known to deform or disturb the outer conductor of the cable and this has led to variations in the electrical characteristics of the cable from those desired. Furthermore, the crimping pressure deforms the fitting and therefore the fitting cannot be subsequently used after removal.

The present invention provides, according to a further aspect, an assembly in which the above disadvantage is avoided together with the need for using a crimping tool.

Accordingly the present invention also provides a gas pressurizable coaxial cable and cable termination fitting assembly comprising a cable having an inner conductor and an outer conductor concentrically held around and electrically isolated from the inner conductor to define an annular air space between the conductors, a jacket surrounding the outer conductor, and a cable termination fitting having an outer conductor shroud means, said shroud means formed with a female screw thread which is intimately screwed directly onto an end portion of the jacket and also having an annular end sealing surface, the end sealing surface held in abutting sealing engagement against an end of the jacket by the screw connection between the female thread and the jacket.

It has been found that by attaching the fitting directly to the jacket with the use of the screw thread as defined above, then a perfectly sealed attachment is provided which is as reliable as a crimped arrangement while avoiding the previous disadvantages, i.e. distortion and disturbing of the outer conductor and the fitting and also the need to use a crimping tool. Thus, the fitting may be used again after removal.

Figure 2:
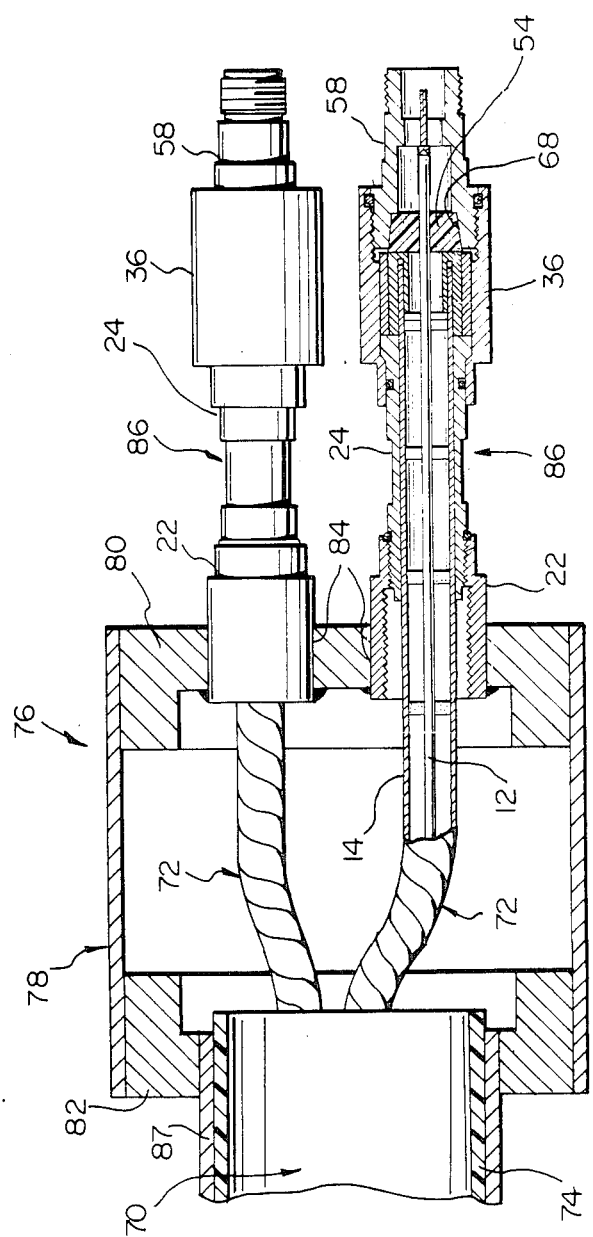

Embodiments of the invention will now be described by way of example, with reference to the accompanying drawings in which:

FIG. 1 relates to a first embodiment and is a cross-sectional view taken along the axis of a gas pressurizable coaxial cable and fitting assembly; and FIG. 2 is a side elevational view, partly in cross-section of a second embodiment.

As shown in FIG. 1, a gas pressurizable coaxial cable 10 has a core comprising a single coaxial conductor assembly. This assembly includes an inner conductor 12 and a surrounding concentric outer conductor 14 which is held spaced from the conductor 12 in conventional fashion by annular dielectric spacers 16. Thus a gas pressurizable space 18 of annular cross-section is formed between the two conductors along the length of the cable. A cable termination fitting 20, to be described, is secured to an end of the cable and for this purpose, an end section of a jacket 19 of the cable is removed to enable end portions of the two conductors to extend from it a specified distance, as shown in FIG. 1, for attachment of the fitting.

The fitting 20 comprises an outer conductor shroud means which is sealed to the jacket 19. The shroud means comprises a first sleeve member 22, which has a female screw thread, and a second sleeve member 24. The sleeve member 24 closely surrounds the outer conductor 14.

The sleeve member 22 has a large diameter end 25 and a small diameter end 26. The large diameter end 25 has an internal or female screw thread 28 and the small diameter end has an internal thread 30 of smaller radius than the thread 28. The sleeve member 22 is secured to the sleeve member 24 by engagement of the thread 30 with a complementary thread of the sleeve member 24 and a resilient rubber seal 32 is compressed between abutment surfaces of these two parts. The end of the sleeve member 24 lying within the sleeve member 22 is formed with a frusto-conical annular end sealing surface 34. To assemble the fitting to the cable, the thread 28 is of the correct diameter to enable the sleeve to be intimately screwed directly onto the end portion of the jacket 19 as shown in FIG. 1. This attachment is performed without pre-forming the thread on the jacket 19 and the thread 28 in fact either cuts into or deforms the outer surface of the jacket to provide the intimate attachment as the sleeve is threaded onto it. Threading of the sleeve member 24 causes the end sealing surface 34 to engage and then abut in intimate sealing arrangement with an end surface of the jacket. This sealing engagement is maintained in use of the fitting and the screw thread attachment to the jacket holds the fitting securely in place. Thus the fitting may be removed from the cable if required without damaging it and may be reattached or attached to other cables as required.

Further to this, the method of attachment of the fitting to the cable does not require the localized pressures necessary for making a crimping operation and does not provide sufficient inward pressure to cause deformation or disturbance of the outer conductor 14 such as could alter the desired electrical characteristics of the cable.

At the other end of the sleeve member 24, the shroud means comprises a larger diameter sleeve 36. A small diameter end section 37 of the sleeve 36 closely surrounds a part of the sleeve member 24 and a resiliently compressible rubber seal 38 held in a recess of member 24 provides a seal between member 24 and the sleeve 36. The main and a larger diameter portion 40 of the sleeve 36 surrounds an enlarged end 42 of member 24 and also surrounds a cylindrical insert 44 concentrically surrounding a conductive ferrule or sleeve 46 which makes electrical contact with the end of the outer conductor. The ferrule 46 has an outer sleeve portion 48 connected to an inner sleeve portion 50 by a radially extending end 52. The inner portion 50 engages intimately with the inner surface of the outer conductor. As shown, the inner conductor 12 extends beyond the outer conductor 14. An annular dielectric plug 54 of the cable termination fitting surrounds the inner conductor and extends axially outwards from the conductor 14 so as to abut the opposing surface of the end 52 of the ferrule 46. The plug is formed from a polycarbonate material and has two flat radially extending surfaces connected by a frusto-conical peripheral surface 56.

A means for holding the plug in a sealing position is provided. This means comprises an annular holding member 58 for shrouding both the end of the inner conductor and an inner conductor terminating pin 60. The member 58 is generally cylindrical with an enlarged end 62 which is itself screw threaded into the sleeve 36 with a seal 64 of resilient rubber material located between the sleeve and the member. The axially outer end of the member 58 is also provided with a screw thread 66 to attach the cable end to any desired equipment.

As can be seen from the drawing, the member 58 at its large diameter end, has a recess 68 with a frusto-conical surface corresponding to the frusto-conical surface 62 of the plug.

To seal the gas pressurizable space 18 with the sleeve members 22 and 24 and sleeve 36 already in position, the insert 44 and the ferrule 46 are located in the position shown. The plug 54 is to be inserted into the sleeve 36 over the end of the inner conductor 12. In being formed from polycarbonate material, the plug 54 has a resiliency which enables it to be compressed radially under a radial pressure so that it will seal against the surface of the inner conductor. This resiliency also enables the plug to return to its uncompressed condition upon removal of the radial pressure so that the plug may be removed from the inner conductor to break the seal in the event that it is required to partially or wholly dismantle the fitting. This means that the fitting and the plug may be reused either upon the same or some other cable for a further sealing operation.

It follows that before the terminating pin 60 is located in position and with the member 58 also removed, the plug 54 may be slid loosely onto the inner conductor with the orifice in the plug made sufficiently large for this purpose. The terminating pin 60 is then located in position and is soldered onto the end of the conductor. The polycarbonate material also has a certain heat resistance which is sufficient to prevent or resist degradation or detrimental softening of the material of the plug caused by any heat transfer to the loosely mounted plug from the soldering operation during the mounting of the terminating pin in position. Although the distance between the plug and the adjacent end of the terminating pin may be only of the order of 6 mm, it is found that the heat transfer has no detrimental effect upon the loosely mounted plug even though the melt temperature for the polycarbonate is approximately 260° C. while the melting temperature of the standard tin/lead solder used is in the region of 343° C. After the terminating pin has been soldered into position and the inner conductor has cooled, the member 58 is inserted into the end of the sleeve 36 and is screwed into it. As the member 58 advances towards the sleeve member 24, it engages the plug and urges it along the inner conductor until the plug contacts an abutment surface, i.e. the opposing surface of the end 52 of the ferrule 46. After this surface has been contacted by the plug, further movement of the member 58 onto the plug causes the opposing frustoconical surfaces of the plug and the member to be pressed against each other with the result that a radial pressure is applied through these surfaces upon the plug. This radial pressure resiliently compresses the plug radially inwards so that it sealingly grips the surface of the inner conductor.

It follows that the plug provides an adequate seal against the inner conductor to prevent pressurized air from escaping along the inner conductor. In addition to this, an airtight seal is provided radially outwards from the space 18. This further airtight seal is provided at least partly by the abutting contact between the plug and the opposing surface of the ferrule 46 and also partly by the seals 38 and 64 and by the sealing effect between the frusto-conical surfaces of the plug and the member 58.

In tests which have been made, it has been found that with the cable end and fitting assembly submerged over a practical range of temperature conditions in water with air pressure conditions within the space 18 at approximately 140 kilopascals, there has been no leakage. This pressure under test conditions is approximately twice that normally applied within cables in use.

The above assembly therefore provides an adequate seal between a coaxial cable and a cable termination fitting where only one coaxial conductor assembly is present in the core. Advantageously, it enables the fitting to be removed and replaced or reused on a different cable for sealing purposes. Further to this, any problems concerned with leakage of air pressure from within the space 18 of the coaxial cable has been overcome.

In a second embodiment shown in FIG. 2, a gas pressurizable cable 70 has a core comprising a plurality, namely two, coaxial conductor assemblies 72. Each assembly includes an inner conductor 12 and outer conductor 14 as in the first embodiment. A jacket 74 of the cable is removed sufficiently far from one end of the cable to expose adequate lengths of the assemblies 72 for assembly of a cable termination fitting 76 as will now be described.

The cable termination fitting comprises shroud means including a main sleeve means which in turn comprises a metal sleeve 78 and a disc end plate 80. The sleeve 78 is of sufficiently large diameter to fit around and be sealed to an end portion of the jacket. This seal is made in conventional manner with the use of a lead disc end plate 82 and an auxiliary lead sleeve 87 between the sleeve 78 and the jacket.

At the other end of sleeve 78, the end plate which is also formed from lead, has two orifices 84 passing through it (i.e. one orifice for each assembly 72). The shroud means also includes two secondary sleeve means 86. Each sleeve means 86 has first and second sleeve members 22 and 24 and a sleeve 36 identical to those described in the first embodiment. In this embodiment, however, the sleeves 22 are inserted through the orifices 84 and are soldered to the end plate to hold them in position.

The end portions of the assemblies 72 which extend from the jacket 74, pass through the secondary sleeve means 86 and the fittings 76 are each completed in the manner described in the first embodiment together with the plug 54 and holding member 58. The only difference between the finished structure and that of the first embodiment is that as the two assemblies 72 do not have their own jackets then the sleeve members 22 are not secured to jackets and the sleeve members 24 are not sealed to jackets.

What is claimed is:

1. A gas pressurizable coaxial cable and cable termination fitting assembly comprising:
   (a) a cable with a core incorporating a coaxial conductor assembly in which an inner conductor and an outer conductor are provided, the outer conductor electrically isolated from and concentrically spaced around the inner conductor to define an annular air space between the conductors of the conductor assembly, a jacket surrounding the core with the said coaxial conductor assembly having an end portion extending axially beyond one end of the jacket at one end of the cable;
   (b) a cable termination fitting located at said one end of the cable, the fitting comprising:-
      (i) an outer conductor shroud means sealed to the jacket and extending axially beyond said jacket and surrounding the end portion of the coaxial conductor assembly; and
      (ii) an annular dielectric plug concentrically surrounding the inner conductor, the plug being resiliently compressible to seal against the inner conductor under a radial pressure upon the plug and to release itself from the inner conductor upon removal of the radial pressure, and means for holding the plug in a sealing position, said holding means detachably mounted upon and forming an airtight seal with the shroud means and engaging an axial side of the plug for urging the plug axially against an abutment surface, the plug and the holding means having opposing surfaces which are disposed to cause the holding means to apply radial pressure against the plug and compress the plug sealingly against the inner conductor.

2. An assembly according to claim 1 wherein the opposing surfaces are sealed together.

3. An assembly according to claim 1 wherein when the holding means is in a position axially removed from against the plug and the plug is loosely held upon the inner conductor, the plug has sufficient heat resistance to avoid it being deformed or softened under the influence of heat generated during soldering an adjacent end of the inner conductor.

4. An assembly according to claim 1 having a single coaxial conductor assembly disposed concentrically within the jacket and the shroud means of the fitting is formed with a female screw thread and is intimately screwed directly onto an end portion of the jacket, the shroud means also having an annular end sealing surface which is disposed in abutting sealing engagement against the end of the jacket by the screw connection between the shroud means and the jacket.

5. An assembly according to claim 4 wherein the shroud means comprises a first sleeve member formed with the female screw thread and screwed directly onto the jacket and a second sleeve member which is provided with the annular end sealing surface and is screw threadedly mounted onto the first sleeve member.

6. An assembly according to claim 1 wherein the end of the outer conductor of the conductor assembly is provided with a conductive sleeve in electrically conductive engagement with the outer conductor and the conductive sleeve provides the abutment surface against which the plug is urged.

7. An assembly according to claim 1 wherein the core comprises at least two coaxial conductor assemblies each of which has an end portion extending axially beyond said one end of the jacket, and the shroud means includes a main sleeve means which is sealed to the jacket;

the main sleeve means having an end plate which extends radially inwards, the end plate formed with orifices, one orifice for each conductor assembly;

the shroud means also including a plurality of secondary sleeve means, one secondary sleeve means for each coaxial conductor assembly, each secondary sleeve means sealingly secured to the end plate and aligned with a respective one of the orifices with said end portions of the coaxial conductor assemblies extending, each through a respective one of the orifices and into a respective one of the secondary sleeve means; and in respect of each coaxial conductor, an annular dielectric plug surrounds the inner conductor and a holding means is detachably mounted upon and forms an airtight seal with the respective secondary sleeve means and engages an axial side of the plug for urging the plug axially against an abutment surface.

8. A method of attaching a cable termination fitting to a gas pressurizable coaxial cable having a jacket and a core comprising at least one coaxial conductor assembly in which an inner conductor is surrounded by an outer conductor comprising:

removing jacket material at one end of the cable to expose an end portion of the at least one coaxial conductor assembly, said end portion extending axially beyond the end of the jacket;

attaching an outer conductor shroud means of the fitting sealingly to the jacket with the shroud means extending axially beyond the jacket and surrounding said end portion of the at least one coaxial conductor assembly;

locating an annular plug concentrically around the inner conductor and axially facing an abutment surface, the plug being resilient to radially inward compression under a radial pressure so as to return substantially to its uncompressed condition when the pressure is removed;

detachably mounting a plug holding means to the shroud means to urge the plug against the abutment surface; and applying a radial pressure to the plug during mounting of the holding means so as to compress the plug radially inwards and cause it to apply sealing pressure against the inner conductor.

9. A method according to claim 8 comprising placing the plug loosely around the inner conductor with an end portion of the inner conductor projecting outwardly from the plug and from the outer conductor, and connecting the conductor end portion to a conductor terminating member by heating the end portion and terminating member, the plug in its loose mounted condition having sufficient resistance to heat transfer to resist degradation or detrimental softening of the plug; and, after cooling of the inner conductor, attaching the holding means and applying the sealing pressure to the inner conductor.

10. A method according to claim 8 wherein the core comprises a single coaxial conductor assembly disposed concentrically within the jacket and said method comprises attaching the shroud means with a female screw thread of the shroud means to the jacket by screwing the shroud means intimately and directly onto an end portion of the jacket, the shroud means also having an end sealing surface, and disposing the end sealing surface in abutting engagement against the end of the jacket.

11. A method according to claim 8 wherein the core comprises at least two coaxial conductor assemblies each of which has an end portion extending axially beyond said one end of the jacket and said method comprises:

attaching a main sleeve means of the shroud means sealingly to the jacket, the main sleeve means including an end plate which extends radially inwards, the end plate formed with orifices, one for each conductor assembly; and the method also comprising causing the coaxial conductor assemblies to extend one through each secondary sleeve means of the shroud means, and detachably mounting the plug holding means to the secondary sleeve means to urge the plugs against respective abutment surfaces.

12. A gas pressurizable coaxial cable and cable termination fitting assembly comprising a cable having an inner conductor and an outer conductor concentrically held around and electrically isolated from the inner conductor to define an annular air space between the conductors, a jacket surrounding the outer conductor, and a cable termination fitting having an outer conductor shroud means, said shroud means formed with a female screw thread which is intimately screwed directly onto an end portion of the jacket and also having an annular end sealing surface, the end sealing surface held in abutting sealing engagement against an end of the jacket by the screw connection between the female thread and the jacket.

13. An assembly according to claim 12 wherein the shroud means has a first sleeve member formed with the female screw thread and a second sleeve member having the annular end sealing surface and mountable upon the first sleeve member.

* * * * *